(12) United States Patent
Guillard et al.

(10) Patent No.: US 11,913,718 B2
(45) Date of Patent: *Feb. 27, 2024

(54) ARGON AND POWER PRODUCTION BY INTEGRATION WITH POWER PLANT

(71) Applicant: L'Air Liquide, Societe Anonyme pour l'Etude et l'Exploitation des Procedes Georges Claude, Paris (FR)

(72) Inventors: Alain Guillard, Houston, TX (US); Michael A. Turney, Houston, TX (US); Abigail Bonifacio, Vallejo, CA (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 1127 days.

This patent is subject to a terminal disclaimer.

(21) Appl. No.: 16/697,712

(22) Filed: Nov. 27, 2019

(65) Prior Publication Data
US 2021/0156612 A1    May 27, 2021

(51) Int. Cl.
 *F25J 1/02* (2006.01)
 *F25J 1/00* (2006.01)
 *F25J 3/02* (2006.01)

(52) U.S. Cl.
 CPC ............ *F25J 1/0222* (2013.01); *F25J 1/002* (2013.01); *F25J 3/0285* (2013.01); *F25J 2210/42* (2013.01); *F25J 2210/50* (2013.01); *F25J 2210/58* (2013.01); *F25J 2210/80* (2013.01)

(58) Field of Classification Search
 CPC .......... F25J 1/0222; F25J 1/002; F25J 3/0285; F25J 2210/42; F25J 2210/50; F25J 2210/58; F25J 2210/80; F25J 2220/82; F25J 2230/30; F25J 3/0266; F25J 2205/40; F25J 2205/66; F25J 2205/80; F25J 3/0257; F25J 2210/70; F25J 2240/02; F05D 2220/62; Y02C 20/40
 See application file for complete search history.

(56) References Cited

U.S. PATENT DOCUMENTS

| | | |
|---|---|---|
| 5,724,805 A | 3/1998 | Golomb et al. |
| 8,501,125 B2 | 8/2013 | Vandor |
| 2010/0018218 A1 | 1/2010 | Riley et al. |
| 2012/0067082 A1 | 3/2012 | Tranier |

*Primary Examiner* — Thuan D Dang
(74) *Attorney, Agent, or Firm* — Justin K. Murray

(57) ABSTRACT

A method for producing power and argon is provided by providing a residual gas stream, purifying the residual gas stream in a front-end purification unit to remove carbon dioxide, thereby forming a purified residual gas stream, and introducing the purified residual gas stream to a cold box, wherein the purified residual gas stream is cooled and expanded within the cold box to produce power and then fed to a distillation column system for separation therein, thereby forming an argon-enriched stream and optionally a nitrogen-enriched stream and/or an oxygen-enriched stream, wherein the residual gas stream is sourced from a retentate stream of a cold membrane having oxygen, nitrogen, carbon dioxide, and argon.

13 Claims, 2 Drawing Sheets

ARGON AND POWER PRODUCTION BY INTEGRATION WITH POWER PLANT

TECHNICAL FIELD

The present invention generally relates to a method and apparatus for improving the efficiencies of power plant. Certain embodiments of the invention are particularly useful for capturing carbon dioxide from the flue gas of the power plant and utilizing the pressurized carbon dioxide stream to provide power and to recover argon.

BACKGROUND OF THE INVENTION

Power plants based on steam production typically produce a flue gas having large amounts of carbon dioxide. For environmental reasons, the carbon dioxide within the flue gas is captured A "clean energy" power plant requires the capture of $CO_2$ from the resulting flue gas. One of the current $CO_2$ capture methods involves the use of a cold membrane system. While the $CO_2$ goes to the low pressure permeate, the remainder, which is >90% nitrogen and >1% argon exits as a residue stream at pressure similar to the feed pressure (~15 bara). A portion of this high-pressure residue stream is letdown across a turbine to generate the refrigeration for the $CO_2$ capture process. The remainder of the high-pressure residue stream is available to be utilized for other purposes. For example, let down in a combined cycle turbine to generate power FIG. 1 provides a schematic of a system as described above. As shown in FIG. 1, flue gas 2 is withdrawn from a power plant and sent to a pretreatment unit. From there, the treated gas stream is compressed in a compressor, with the heat of compression being removed using boiler feed water (BFW). The compressed stream 4 is then dried in dryer before being cooled in heat exchanger. After cooling, the stream is separated in a cold membrane, wherein the majority of the carbon dioxide permeates through the membrane and is then compressed, liquefied, and then heated before being collected as $CO_2$ product stream 6.

The retentate 8, which contains more than 90% nitrogen and more than 1% argon, remains at high pressure (about 15 bara), wherein a portion of it is used to provide refrigeration for the heat exchanger by expanding in cold expansion. The remaining portion 10 can be used for other purposes, for example, expanding in a turbine to provide additional power.

However, the contents of this stream are then sent to a stack and vented to the atmosphere, and therefore, valuable nitrogen and argon are lost.

BRIEF SUMMARY OF THE INVENTION

The present invention is directed to a device and a method that satisfies at least one of these needs. The objective of the current invention is to improve the overall efficiency by producing power, as well as recovering argon within this residue stream. In particular, it is possible to produce argon from this residue stream at a lower cost than the traditional method of air separation due to the absence or reduced oxygen content, higher concentrations of argon, and higher source pressure.

In one embodiment, the unutilized high-pressure residue stream is letdown in an expansion turbine to generate power and refrigeration needed to co-produce an argon product stream. In one embodiment, the pressurized residue stream is purified in a purification system, preferably in an amine or temperature swing adsorber (TSA), to remove freezable components such as $CO_2$. The purified residue stream is then expanded to an intermediate pressure (preferably about 9 bara), cooled, and split into a first portion, which is further cooled, expanded, and then sent to a distillation column system for separation therein. A second portion is turbo-expanded to provide additional refrigeration for the process and sent to the distillation column system for separation therein. Nitrogen, oxygen, and argon are recovered from the distillation column system according to methods known heretofore.

In one embodiment, a portion of the nitrogen and/or oxygen from the cold box is used to regenerate the purification system, wherein the resulting regeneration stream from the purification system is then sent to the flue gas vent stack.

In one embodiment, a method for producing power and argon is provided. In one embodiment, the method can include: providing a residual gas stream, wherein the residual gas stream is sourced from a retentate stream of a cold membrane, wherein the residual gas stream comprises nitrogen, argon, oxygen, and carbon dioxide; purifying the residual gas stream in a front-end purification unit to remove carbon dioxide, thereby forming a purified residual gas stream; and introducing the purified residual gas stream to a cold box, wherein the purified residual gas stream is cooled and expanded within the cold box and then fed to a distillation column system for separation therein, thereby forming an argon-enriched stream, wherein the purified residual gas stream is expanded in at least one turbine that is configured to produce power.

In optional embodiments of the method for producing argon and power:
  the residual gas stream is derived from a flue gas stream from a power plant;
  the at least one turbine comprises a warm turbine, wherein the step of introducing the purified residual gas stream to a cold box further comprises expanding the purified residual gas stream in the warm turbine prior to cooling in a heat exchanger;
  the step of introducing the purified residual gas stream to a cold box further comprises, after expanding in the warm expander, fully cooling a first portion of the purified residual gas stream in the heat exchanger before subsequently expanding said first portion in a Joule-Thompson valve prior to feeding the first portion to the distillation column system;
  the at least one turbine further comprises a cold turbine, wherein the step of introducing the purified residual gas stream to a cold box further comprises, after expanding in the warm expander, partially cooling a second portion of the purified residual gas stream in the heat exchanger and then cold expanding said second portion in the cold turbine prior to feeding the second portion to the distillation column system;
  the method further comprises: withdrawing a nitrogen-enriched stream and an oxygen-enriched stream from the distillation column system; and warming the nitrogen-enriched stream and the oxygen-enriched stream in the heat exchanger;
  the method further includes regenerating the front-end purification unit using a stream selected from the group consisting of the nitrogen-enriched stream, the oxygen-enriched stream, and combinations thereof;
  the argon-enriched stream is produced in a net positive energy environment, such that more electricity is produced than is consumed;

the residual gas stream is at a pressure above 13 bara and/or the method comprises an absence of providing external refrigeration such that the separation of nitrogen, oxygen, and argon within the distillation column system is effected without cooling other than that provided by the expansion of streams derived from the residual gas stream.

In another embodiment, the method for producing power and argon can include the steps of: providing a residual gas stream, wherein the residual gas stream is sourced from a retentate stream of a cold membrane, wherein the residual gas stream comprises nitrogen, argon, oxygen, and carbon dioxide, wherein the residual gas stream is derived from a flue gas stream from a power plant; purifying the residual gas stream in a front-end purification unit to remove carbon dioxide, thereby forming a purified residual gas stream; expanding the purified residual gas stream in a warm turbine to produce an expanded purified residual gas stream and export power; introducing the expanded purified residual gas stream to a heat exchanger; fully cooling a first portion of the expanded purified residual gas stream in the heat exchanger before subsequently expanding said first portion in a Joule-Thompson valve prior to feeding the first portion to a distillation column system for separation therein; partially cooling a second portion of the purified residual gas stream in the heat exchanger and then cold expanding said second portion in a cold turbine prior to feeding the second portion to the distillation column system, wherein the cold turbine produces a second amount of export power; and withdrawing a nitrogen-enriched stream, an oxygen-enriched stream, and an argon-enriched stream from the distillation column system.

In optional embodiments of the method for producing argon and power:

the method also includes regenerating the front-end purification unit using a stream selected from the group consisting of the nitrogen-enriched stream, the oxygen-enriched stream, and combinations thereof; and/or the method comprises an absence of providing external refrigeration such that the separation of nitrogen, oxygen, and argon within the distillation column system is effected without cooling other than that provided by the expansion of streams derived from the residual gas stream.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
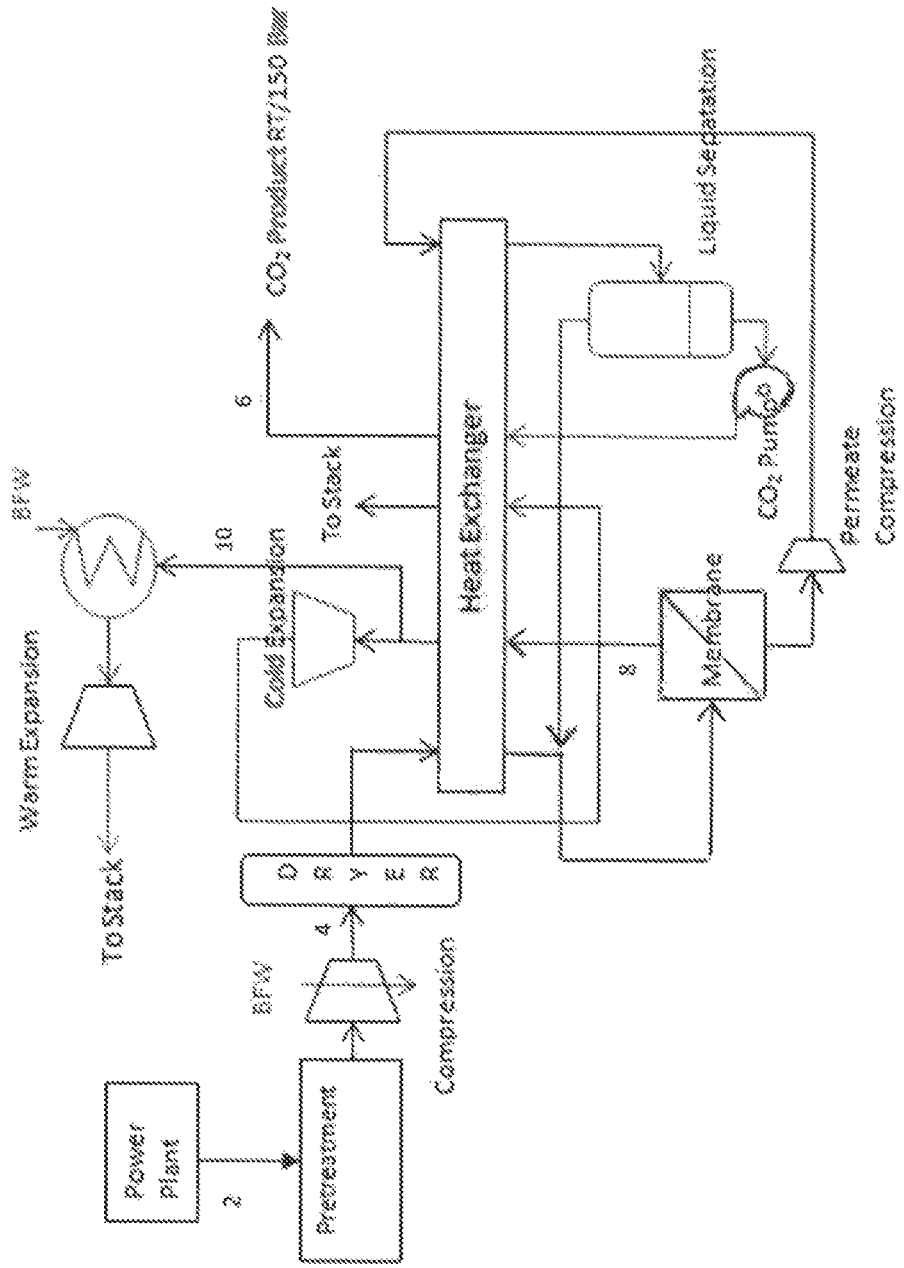
FIG. 1 is a process flow diagram of an existing power plant and carbon dioxide cold capture.
Figure 2:
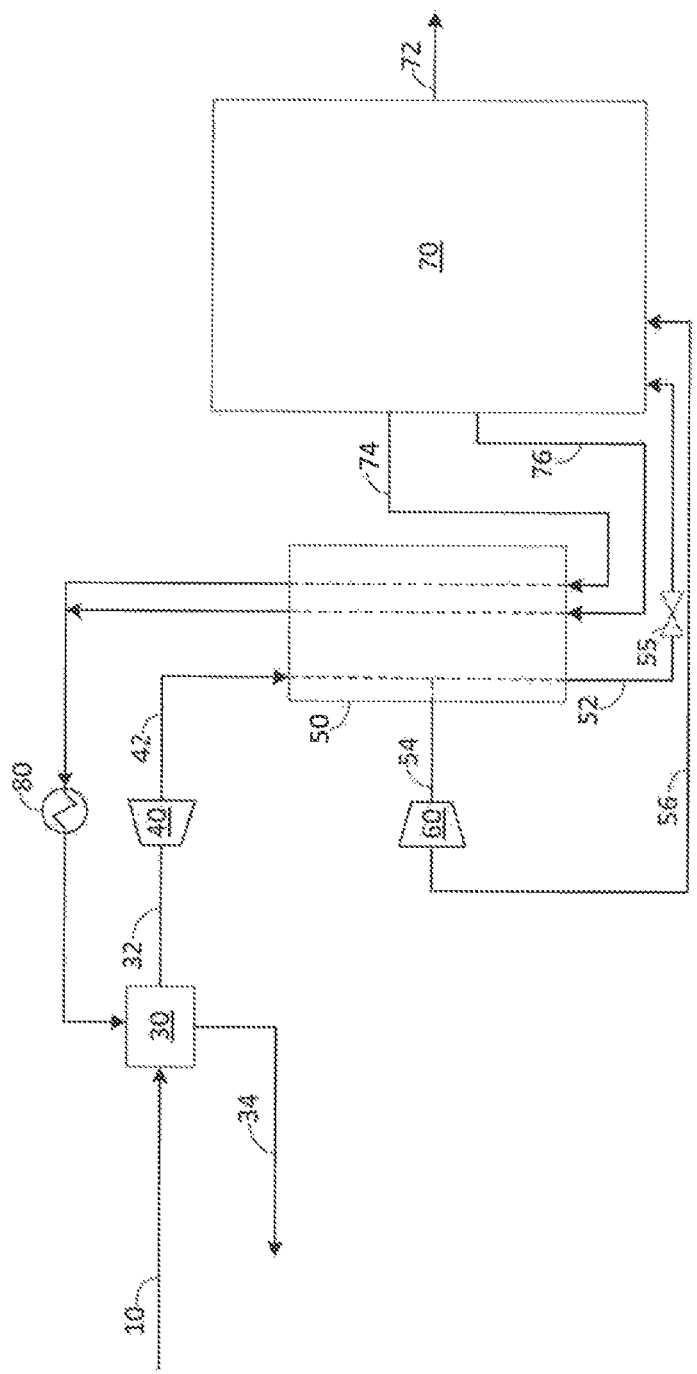
FIG. 2 is a process flow diagram of an embodiment of the present invention.

Referring to FIG. 2, pressurized residue stream 10, which contains nitrogen, oxygen, argon, and carbon dioxide and is preferably at a pressure of at least 15 bara, is sent to front-end purification unit 30 to remove components such as carbon dioxide that would freeze at cryogenic temperatures (e.g., below −40° C.). Purified stream 32 is then expanded to a medium pressure, for example, about 9 bara, in warm expander 40 to form expanded stream 42. The expanded stream 42 is then cooled in heat exchanger 50, wherein it is preferably split into two streams, with first portion 52 being fully cooled and then expanded in valve 55 prior to being introduced to distillation column system 70 for separation therein. Second portion 54 is only partially cooled before expanding to a low pressure in cold expander 60 to form cold expanded stream 56, which is also introduced in the distillation column system 70 for separation therein. The expansion provides the majority of the refrigeration for the cold separation within the distillation column system 70.

Oxygen 74 and nitrogen 76 are produced by distillation column system 70 and heated in heat exchanger 50. In addition to collection as product streams, oxygen 74 and/or nitrogen 76 can be used as regeneration gases in front-end purification unit 30, with the regenerated gas 34, which now contains the desorbed carbon dioxide, being sent back to the flue gas vent stack.

Argon product 72 is recovered from distillation column system.

Working Example

A simulation was run using the embodiment shown in FIG. 2. 456 mt/h of pressurized residue stream 10 containing 93.7% nitrogen, 3.3% oxygen, 1.1% argon, and 1.9% CO2 and at 15 bara was expanded to 9 bara in warm expander 40. The second portion 54 was expanded to about 6 to 7 bara pressure. Approximately 165 mtpd liquid argon 72 was produced, while the two turbines also generated a combined 4.7 MW power (4 MW and 0.7 MW, respectively).

Consequently, embodiments of the current invention allow a user to utilize the pressurized residue stream of a cold membrane separator to produce both power and valuable argon.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step or reversed in order.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

What is claimed is:

1. A method for producing power and argon, the method comprising the steps of:
   providing a residual gas stream, wherein the residual gas stream is sourced from a retentate stream of a cold membrane, wherein the residual gas stream comprises nitrogen, argon, oxygen, and carbon dioxide;
   purifying the residual gas stream in a front-end purification unit to remove carbon dioxide, thereby forming a purified residual gas stream; and
   introducing the purified residual gas stream to a cold box, wherein the purified residual gas stream is cooled and expanded within the cold box and then fed to a distillation column system for separation therein, thereby forming an argon-enriched stream, wherein the purified residual gas stream is expanded in at least one turbine that is configured to produce power.

2. The method of claim 1, wherein the residual gas stream is derived from a flue gas stream from a power plant.

3. The method of claim 1, wherein the at least one turbine comprises a warm turbine, wherein the step of introducing the purified residual gas stream to a cold box further comprises expanding the purified residual gas stream in the warm turbine prior to cooling in a heat exchanger.

4. The method of claim 3, wherein the step of introducing the purified residual gas stream to a cold box further comprises, after expanding in the warm expander, fully cooling a first portion of the purified residual gas stream in the heat exchanger before subsequently expanding said first portion in a Joule-Thompson valve prior to feeding the first portion to the distillation column system.

5. The method of claim 3, wherein the at least one turbine further comprises a cold turbine, wherein the step of introducing the purified residual gas stream to a cold box further comprises, after expanding in the warm expander, partially cooling a second portion of the purified residual gas stream in the heat exchanger and then cold expanding said second portion in the cold turbine prior to feeding the second portion to the distillation column system.

6. The method of claim 3, wherein the method further comprises: withdrawing a nitrogen-enriched stream and an oxygen-enriched stream from the distillation column system; and warming the nitrogen-enriched stream and the oxygen-enriched stream in the heat exchanger.

7. The method of claim 6, further comprising regenerating the front-end purification unit using a stream selected from the group consisting of the nitrogen-enriched stream, the oxygen-enriched stream, and combinations thereof.

8. The method of claim 1, wherein the argon-enriched stream is produced in a net positive energy environment, such that more electricity is produced than is consumed.

9. The method of claim 1, wherein the residual gas stream is at a pressure above 13 bara.

10. The method of claim 1, wherein the method comprises an absence of providing external refrigeration such that the separation of nitrogen, oxygen, and argon within the distillation column system is effected without cooling other than that provided by the expansion of streams derived from the residual gas stream.

11. A method for producing power and argon, the method comprising the steps of:
    providing a residual gas stream, wherein the residual gas stream is sourced from a retentate stream of a cold membrane, wherein the residual gas stream comprises nitrogen, argon, oxygen, and carbon dioxide, wherein the residual gas stream is derived from a flue gas stream from a power plant;
    purifying the residual gas stream in a front-end purification unit to remove carbon dioxide, thereby forming a purified residual gas stream;
    expanding the purified residual gas stream in a warm turbine to produce an expanded purified residual gas stream and export power;
    introducing the expanded purified residual gas stream to a heat exchanger;
    fully cooling a first portion of the expanded purified residual gas stream in the heat exchanger before subsequently expanding said first portion in a Joule-Thompson valve prior to feeding the first portion to a distillation column system for separation therein;
    partially cooling a second portion of the purified residual gas stream in the heat exchanger and then cold expanding said second portion in a cold turbine prior to feeding the second portion to the distillation column system, wherein the cold turbine produces a second amount of export power; and
    withdrawing a nitrogen-enriched stream, an oxygen-enriched stream, and an argon-enriched stream from the distillation column system.

12. The method of claim 11, further comprising regenerating the front-end purification unit using a stream selected from the group consisting of the nitrogen-enriched stream, the oxygen-enriched stream, and combinations thereof.

13. The method of claim 11, wherein the method comprises an absence of providing external refrigeration such that the separation of nitrogen, oxygen, and argon within the distillation column system is effected without cooling other than that provided by the expansion of streams derived from the residual gas stream.

* * * * *